United States Patent [19]

Nishimatsu et al.

[11] Patent Number: 4,780,366
[45] Date of Patent: Oct. 25, 1988

[54] MAGNETIC RECORDING MEDIUM FOR IMAGE RECORDING

[75] Inventors: Masaharu Nishimatsu, Komoro; Hiroyuki Arioka; Keiji Koga, both of Saku, all of Japan

[73] Assignee: TDK Corporation, Tokyo, Japan

[21] Appl. No.: 902,055

[22] Filed: Aug. 26, 1986

Related U.S. Application Data

[63] Continuation-in-part of Ser. No. 729,178, May 1, 1985, abandoned.

[30] Foreign Application Priority Data

Jul. 20, 1984 [JP] Japan .................. 59-149714

[51] Int. Cl.$^4$ .............................. G11B 5/70
[52] U.S. Cl. .................. 428/323; 427/131; 428/329; 428/694; 428/900
[58] Field of Search ............ 428/323, 329, 694, 900; 427/131

[56] References Cited

U.S. PATENT DOCUMENTS

| | | | |
|---|---|---|---|
| 4,328,935 | 5/1982 | Steel | 428/694 |
| 4,419,406 | 12/1983 | Isobe et al. | 428/694 |
| 4,420,532 | 12/1983 | Yamaguchi et al. | 428/694 |
| 4,474,843 | 10/1984 | Miyoshi et al. | 428/694 |
| 4,693,934 | 9/1987 | Nishimatsu et al. | 427/131 |

FOREIGN PATENT DOCUMENTS

2159731 12/1985 United Kingdom .

*Primary Examiner*—Paul J. Thibodeau
*Attorney, Agent, or Firm*—Oblon, Fisher, Spivak, McClelland & Maier

[57] ABSTRACT

A ferromagnetic alloy image recording tape, wherein the stiffness of the entire tape is represented by the formula:

$$0.149 \times \frac{w \times a^3}{d \times b} = 0.05 \text{ to } 0.15 \text{ g.mm}$$

where
w: load (g)
a: radius (mm) of the tape ring
b: width (mm) of the tape
d: deformation (mm) of the tape ring 1 Claim, 2 Drawing Sheets

MAGNETIC RECORDING MEDIUM FOR IMAGE RECORDING

This application is a continuation-in-part of application Ser. No. 729,178, filed May 1, 1985, now abandoned.

The present invention relates to a magnetic recording medium. More particularly, the present invention relates to a ferromagnetic alloy image recording tape in which a ferromagnetic alloy constitutes a magnetic recording layer, whereby the fluctuation in the output, clogging and dropouts are minimized and which has excellent running stability and durability.

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

Coating-type magnetic recording media in which an alloy magnetic powder is used, have higher coercive forces and greater saturation magnetization than conventional $\gamma$-$Fe_2O_3$ or Co-doped type. Accordingly, ferromagnetic alloy image recording tapes have excellent electromagnetic conversion characteristics. However, conventional alloy tapes have a weak force of contact (touch) with a head, whereby the head touch of the tapes tends to be poor, and a fluctuation of the output, clogging or dropout is likely to be brought about.

The present inventors have conducted extensive researches to overcome such drawbacks, and have finally found that a magnetic tape having excellent running stability with minimum fluctuation of the output, clogging and dropout, can be obtained when, in the magnetic recording tape provided with a ferromagnetic alloy magnetic layer formed on a non-magnetic substrate, the stiffness of the entire ferromagnetic alloy image recording tape is within a certain specific range. The present invention is based on this discovery.

Namely, the present invention provides a ferromagnetic alloy image recording tape, wherein the stiffness of the entire tape is represented by the formula:

$$0.149 \times \frac{w \times a^3}{d \times b} = 0.05 \text{ to } 0.15 \text{ g.mm}$$

where
w: load (g)
a: radius (mm) of the tape ring
b: width (mm) of the tape
d: deformation (mm) of the tape ring Now, the present invention will be described in detail with reference to the preferred embodiments.

In the accompanying drawings.

Figure 1:
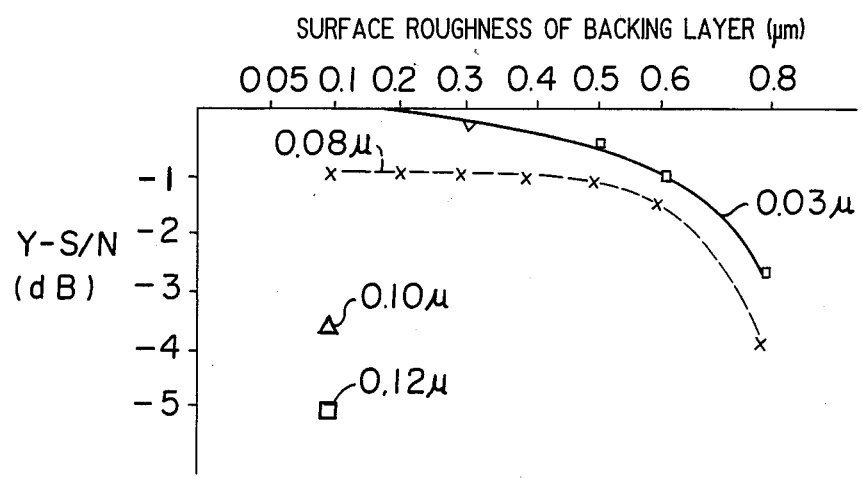
FIG. 1 is a graph illustrating the relation between the surface roughness of the magnetic layer and the back coating layer of a magnetic recording medium and the video signal to noise ratio Y-S/N, where Y signifies video and S/N the signal to noise ratio.

The stiffness represented by the above formula is obtained in the following manner. Namely, a ferromagnetic alloy image recording tape is formed into a ring with its manetic layer side located inside and with the base film side (which may be provided with a back coating layer) located outside, whereby the diameter of the ring of the tape is a (mm) and the width of the tape is b (mm). The tape ring is placed so that the tape surface is in contact with a support, and a load w (g) is exerted to the tape surface from the top of the tape ring, whereby the deformation in the direction of the force is d (mm). Then, the respective values a, b, w and d are applied to the above formula to obtain the stiffness.

If the tape is so stiff that the value of stiffness exceeds 0.15 g.mm, the output is likely to fluctuate and clogging or dropout is likely to result. Namely, the head touch of the tape is poor, i.e. if the stiffness value is too high, the touch of the tape with the head tends to be poor, thus leading to such undesirable results. When the value is 0.15 g.mm or less, the tape is flexible, and the head touch is satisfactory, whereby the above difficulties will be solved. On the other hand, if the value of the stiffness of the entire ferromagnetic alloy image recording tape is less than 0.05 g.mm, the head touch tends to be too strong, whereby the tape running tends to be difficult, and the abrasion of the top coating and the adherence of the tape to the head increase, such being undesirable. The stiffness is preferably within a range of from 0.05 to 0.13 g.mm, more preferably from 0.06 to 0.11 g.mm.

To the ferromagnetic alloy image recording tape of the present invention, it is possible to incorporate an inorganic pigment having an average particle size of at most 0.7 $\mu$m and a Mohs hardness of at least 6. A pigment having a Mohs hardness of less than 6 tends to lead to a fluctuation of the output, clogging or dropout, and does not provide a cleaning effect. Further, from the viewpoint of the electromagnetic conversion output, it is desirable to use an inorganic pigment having an average particle size of at most 0.7 $\mu$m. As such an inorganic pigment, there may be employed, for instance, $TiO_2$, $SnO_2$, $SiO_2$, $ZrO_2$, $FeS_2$, $MgO$, $Cr_2O_3$, $Al_2O_3$, $Y_2O_3$, $CeO_2$, $Fe_3O_4$, $Fe_2O_3$, $ZrSiO_4$, $Sb_2O_5$, $K_2O$, $BeO$, $NiO$, $FeCr_2O_4$, $MgTiO_2$, $FeAl_2O_4$, $CaTiO_2$, $MnO_2$, $ZrSiO_4$ or $ZnS$.

The adjustment of the stiffness of the ferromagnetic alloy tape can be conducted by (1) changing the thickness of the base film, (2) using a base film having flexibility (i.e. a low Young's modulus), (3) a combination, for the base film, of a stiff material on one side and a material having a low Young's modulus on the other side, (4) changing the strength of the ferromagnetic alloy magnetic layer, (5) using a back coating layer having flexibility, or (6) providing a flexible undercoating beneath the ferromagnetic alloy layer and/or back coating layer, or incorporating a pigment to harden the ferromagnetic alloy layer and/or back coating layer.

For the base film (non-magnetic base material) for the ferromagnetic alloy image recording tape, there may be employed a polyester, a polyethylene terephthalate, an aromatic polyester, a polycarbonate, an aromatic polyamide, a polysulfone, a polyimide, a diacetate, triacetate, cellophane, a hard polyvinyl chloride or polypropylene. Other materials which are commonly used for the base films of this type, may also be employed.

With respect to the base materials as mentioned in the above items (1), (2) and (3), the stiffness may be adjusted by selecting the Young's modulus and the base film thickness thereof, and the base material for lamination.

The strength of the ferromagnetic alloy magnetic layer as mentioned in the above item (4), may be changed by selecting the binder material, the ratio of the magnetic powder to the binder or the type and amount of the pigment in the ferromagnetic alloy magnetic layer.

The above item (5) can be accomplished by selecting the back coating material.

In the above item (6), a radiation curable resin may be used as the undercoating layer, and as the fine particulate pigment, the same inorganic pigment as used in the above-mentioned ferromagnetic alloy magnetic layer or the after-mentioned back coating layer, may be employed Further, a pigment having an average particle size of at most 500 Å is preferred. In the case of $SiO_2$, the fine particulate pigment is available in the form of (1) a colloidal solution of super-fine particles of silicic anhydride (Snowtex (trademark), an aqueous system, a methanol silica sol, etc., manufactured by Nissan Chemical Industries, Ltd.) or (2) super-fine particulate anhydrous silica (Standard product: 100 Å) produced by burning purified silicon tetrachloride (Aerosil (trademark), manufactured by Nippon Aerosil Co., Ltd ). Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments. When methanol $SiO_2$ is used as the undercoating layer, it may be applied as it is.

The ferromagnetic alloy image recording tape of the present invention may be provided with a back coating layer, and in some cases, may also be provided with a top coating layer.

With respect to the back coating layer, in the case where the manner for the formation of the back coating layer is of a coating type, the back coating layer contains an inorganic pigment, an organic binder, a lubricant, a dispersant, an antistatic agent, etc.

As the inorganic pigment, there may be mentioned (1) graphite and carbon black having electric conductivity; and (2) inorganic fillers such as $SiO_2$, $TiO_2$, $Al_2O_3$, $Cr_2O_3$, $SiC$, $CaO$, $CaCO_3$, zinc oxide, geothite, $\alpha$-$Fe_2O_3$, talc, kaolin, $CaSO_4$, boron nitride, graphite fluoride, molybdenum disulfide and $ZnS$. The amount of such an inorganic pigment to be incorporated should preferably be from 20 to 200 parts by weight relative to 100 parts by weight of the binder in the case of the electrically conductive pigment (1) and from 10 to 300 parts by weight in the case of the inorganic filler (2). When the amount of the inorganic pigment is too large, there will be disadvantages such that the coating film becomes brittle and the number of dropouts increases.

As the lubricant to be used for the back coating layer of the present invention, there may be employed e.g. silicone oil, fluorine oil, a fatty acid, a fatty acid ester, a paraffin, a liquid paraffin or a surfactant as a lubricant which has been commonly used for the back coating layer of this type. However, it is particularly preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid. Further, metallic soaps of the above-mentioned aliphatic acids with alkali or alkaline earth metals and lecithin may also be used.

As the silicone, there may be employed a fatty acid-modified silicone or a partially fluorinated silicone may be employed. As the alcohol, there may be employed a higher alcohol. As the fluorine oil, there may be employed those produced by electrolytic substitution, telomerization or oligomerization.

Among the lubricants, radiation curable type lubricants may be advantageously employed to prevent the transfer of the roughness of the rear side to the ferromagnetic thin layer or dropouts or to reduce the difference in the output as between the outside and the inside of the roll of a rolled tape, and to make the production on-line possible. Such radiation curable lubricants include compounds containing in their molecules molecular chains exhibiting lubricating properties and acrylic double bonds, such as acrylates, methacrylates, vinyl acetates, acrylic acid amide compounds, vinyl alcohol esters, methyl vinyl alcohol esters, allyl alcohol esters and glycerides. These lubricants may be represented by the following structural formulas:

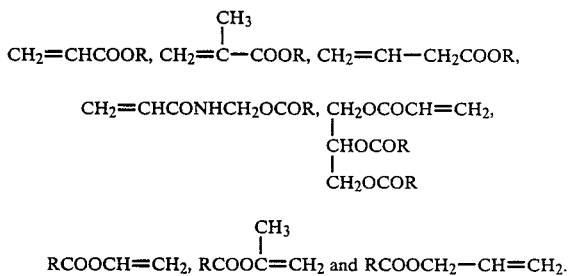

In the above formulas, R is a straight chain or branched, saturated or unsaturated hydrocarbon group having at least 7 carbon atoms, preferably from 12 to 23 carbon atoms, which may be substituted by fluorine. As the fluorinated substituents, there may be mentioned

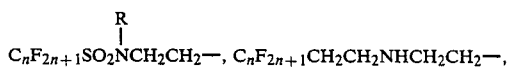

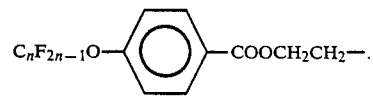

Preferred specific examples of such radiation curable lubricants include stearic acid methacrylate or acrylate, methacrylate or acrylate of stearyl alcohol, methacrylate or acrylate of glycerin, methacrylate or acrylate of glycol, and methacrylate or acrylate of silicone.

If no lubricant is incorporated, the back coating layer will have a high frictional coefficient, whereby flickering of the image or jitters are likely to be brought about.

Further, since the frictional coefficient is especially high under a high temperature running condition, abrasion of the back coating layer is likely to be led, and the tape winding tends to be irregular.

As the organic binder to be used for the back coating layer of the present invention, there may be employed thermoplastic resins, thermosetting resins or reactive resins, or mixtures thereof, which are commonly used for the magnetic recording media. However, from the viewpoint of the strength of the formed coating layer, a curable type resin, particularly radiation curable resin is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diaceate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol copolymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture. Particularly preferred is a combination comprising:

(A) a plastic compound having a molecular weight of from 5,000 to 100,000 and containing at least two radiation-curable unsaturated double bonds;
(B) a rubber-like compound having a molecular weight of from 3,000 to 100,000 and containing at least one radiation-curable unsaturated double bond or containing no such double bond; and
(C) a compound having a molecular weight of from 200 to 3,000 and containing at least one radiation-curable unsaturated double bond, in the proportions of from 20 to 70% by weight of the compound (A), from 20 to 80% by weight of the compound (B) and from 10 to 40% by weight of the compound (C).

The molecular weights of the polymers and oligomers of the above compounds (A), (B) and (C) are number average molecular weights obtained by the following measuring method.

Measurement of an average molecular weight of a binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma N_i M_i}{\Sigma N_i}$$

where Mn is a number average molecular weight, and Ni is a number of molecules having a molecular weight of Mi in a given polymer substance.

In the production of the magnetic recording medium of the present invention, if the organic binder is of a thermosetting type, it is likely that during the process for the production, the lubricant in the back coating layer tends to transfer to the magnetic thin film, whereby there will be undesirable phenomena such that due to irregular running, the output will decrease, or the image will disappear, or the level of friction is still too high, or due to the transfer of the roughness of the rear side, the ferromagnetic alloy magnetic layer will be destroyed. In order to avoid such undesirable phenomena, it is conceivable to initially provide a top coating layer. However, in many cases, such a provision is inconvenient from the viewpoint of operation. Further, in the case of a thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

Whereas, in the case of a radiation curable-type resin, a continuous curing is possible, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape.

Further, according to this method, a solventless resin requiring no solvent may also be cured in a short period of time. Thus, such a resin may also be employed for the back coating layer.

The curing agent to be used for the thermosetting resin may be any curing agent which is commonly used for thermosetting resins of this type. Particularly preferred is an isocyanate-type curing agent. For instance, there may be mentioned Kryspon 4565 and 4560 manufJbNctured by Dai-Nippon Ink & Chemicals Co., Colonate L manufactured by Nippon Polyurethane Industry Co. and Takenate XL-1007 manufactured by Takeda Chemical Industries, Ltd.

As the dispersing agent, there may be employed an organic titanium coupling agent, a silane coupling agent or a surfactant. As the antistatic agent, various surfactants may be employed. Further, usual additives such as carbon black may also be incorporated.

The amounts of the above-mentioned additives may be from 15 to 50 parts by weight of a curing agent, from 1 to 10 parts by weight of a lubricant and from 1 to 10 parts by weight of an antistatic agent such as a dispersing agent or surfactant, relative to 100 parts by weight of the binder.

The thickness of the back coating layer of the present invention is usually within a range of from 0.3 to 10 $\mu$m after being coated and dried.

In the case where the lubricant or the organic binder in the back coating layer (or the top coating layer in some cases) is of a radiation curable type, as the active energy rays to be used for the crosslinking thereof, there may be employed electron beams generated from a radiation accelerator as the source of radiation, $\gamma$-rays generated from $Co^{60}$ as the source of radiation, $\beta$-rays generated from $Sr^{90}$ as the source of radiation, or X-rays generated from X-ray generator as the source of radiation, or ultraviolet rays.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the backing layer (and the top coating layer), it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the above radiation curing, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating appratus.

Further, for the cross-linking by radiation, it is important to irradiate the backing layer (and the top coating layer) with the radiation rays in an inert gas stream such as nitrogen ($N_2$) gas, helium (He) gas, and so forth. It is extremely disadvantageous to conduct the radiation in the air because $O_3$, etc. generated ,by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 5% at the maximum.

In the case of the top coating layer, it is possible to conduct the curing by means of ultraviolet rays by incorporating a photopolymerization sensitizer into the layer.

On the other hand, the magnetic layer of the present invention is made of a ferromagnetic alloy. As such an alloy, there may be mentioned a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr or Co-Ni-Cr.

Heretofore, there have been commonly used as the ferromagnetic powder, for instance, $\gamma$-$Fe_2O_3$, Co-containing $\gamma$-$Fe_2O_3$, $Fe_3O_4$, Co-containing $Fe_3O_4$ or $CrO_2$. However, the magnetic characteristics such as the coercive force and the maximum residual magnetic flux densily of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe-Co, Fe-Co-Ni or Co-Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

The present inventors have prepared magnetic recording media by employing various alloy powders, and have round that a magnetic recording medium with a noise level being sufficiently low and suitable for high density short wave recording is obtainable when the speciric surface area as measured by BET method is at least 48 m²/g, the coercive force of the magnetic layer is at least 1000 Oe, and the surface roughness of the magnetic layer is at most 0.08 μm as a $R_{20}$ value (an average value of 20 values) with a cut off of 0.17 mm by Talystep method. When such a magnetic layer is used for the magnetic recording medium for the image recording according to the present invention, the cinching phenomenon (the loosening of the tape winding when the tape has been stopped abruptly), dropouts and friction can be reduced. Further, there is a trend that as the base for the magnetic tape, a plastic film made of e.g. polyethylene terephthalate, polyethylene naphthalate, polyimide or polyamide has a thickness as thin as about 11 μm or less, and accordingly there is an increasing tendency for greater tightening of the tape winding, thus leading to the transfer of the surface roughness of the back coating surface to the magnetic layer and the consequential decrease in the output. Such drawbacks are also overcome by the above-mentioned combination of the magnetic recording layer and the back coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can be solved also by the present invention.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, FCo, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satisfies the above-mentioned conditions for the coercive force and the specific surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of at least 48 m²/g, it is advisable to employ a surfactant, an organic titanium coupling agent or a silane coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further to calender treatment.

As mentioned above for the back coating layer, in a case where a radiation curable binder is used, a continuous curing is possible for the process, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape. When the base thickness is as thin as 11 μm or less and the surface hardness of the magnetic layer is small as the hardness of the magnetic metal powder is smaller than the magnetic oxide such as $\gamma$-$Fe_2O_3$, the magnetic recording medium is susceptible to the influence of the tightening of the tape winding. However, by means of the radiation-cured magnetic layer and back coating layer, this adverse effect can be eliminated, and the output difference as between the outside and the inside of the wound tape, or the difference in the dropouts can be eliminated. Thus, it is particularly preferred to employ a radiation curable binder for the magnetic layer and back coating layer.

As described in the foregoing, according to the present invention, the stiffness of the entire ferromagnetic alloy image recording tape is within a certain specific range, whereby it is possible to minimize the fluctuation of the output, clogging and dropout and to avoid the running failure, the abrasion of the top coating and the adherence of the tape to the head.

The ferromagnetic alloy tape as a magnetic recording medium of the present invention can be used primarily as a video tape.

A ferromagnetic alloy tape of the present invention having a stiffness within a specific range is a high performance tape having excellent electromagnetic conversion characteristics and physical properties, and is most suitable for video cassette tapes which have enjoyed remarkable technical progress and expansion of the market in recent years and for 8 mm video cassette tapes which are expected to be sold shortly.

Now, the present invention will be described in further detail with reference to Examples. However, it should be understood that the present invention is by no means restricted by these specific Examples.

EXAMPLE 1

(1) Formation of magnetic layers

Various alloy powders were prepared by a wet-reduction method. These powders were composed of acicular particles having an axial ratio (short axis/long axis) of from 1/5 to 1/10 and had a residual magnetic flux density of from 2,000 to 3,000 gauss, a coercive force of from 1,000 to 2,000 Oe and a specific surface area of from 45 to 70 m$^2$/g as measured by BET method. These magnetic powders were mixed in the following proportions in a usual manner to obtain the respective magnetic layers.

Magnetic layer 1 (Thermosetting type)

| | Parts by weight |
|---|---|
| Fe—Co—Ni alloy powder | 100 |
| (Hc = 1200 Oe, long axis: 0.4 μm, short axis: 0.05 μm, BET specific surface area: 52 m$^2$/g) | |
| Al$_2$O$_3$ (0.3 μm) | 10 |
| Vinyl chloride-vinyl acetate-vinyl alcohol copolymer (VAGH manufactured by UCC, U.S.A) | 15 |
| Polyurethane prepolymer (Desmocol 22 manufactured by Bayer AG) | 10 |
| Methyl ethyl ketone/toluene (1/1) | 250 |
| Myristic acid | 2 |
| Sorbitan stearate | 2 |

To this mixture, 30 parts by weight of polyisocyanate (Desmodule L manufactured by Bayer AG) was added to obtain a magnetic coating composition. The magnetic coating composition was applied onto a polyester film in a thickness of 3.5 μm and then subjected to calender treatment.

Magnetic layer 2 (Radiation curable type)

The same magnetic alloy powder and base as used for the magnetic layer 1 were employed. The following mixture was applied onto a polyester film in a thickness of 3.5 μm and subjected to electron beam curing and calender treatment.

| | Parts by weight |
|---|---|
| Fe—Co—Ni alloy powder | 100 |
| Cr$_2$O$_3$ (0.7 μm) | 5 |
| Vinyl chloride-vinyl acetate-vinyl alcohol copolymer (VAGH manufactured by UCC, U.S.A.) | 15 |
| Polyvinyl butyral resin | 10 |
| Acrylic double bond-introduced urethane | 10 |
| Methyl ethyl ketone/toluene (50/50) | 250 |

(2) Formation of back coating layers
Back coating layer 1 (thermosetting type)
The following mixture was thoroughly mixed and dissolved.

| | Parts by weight |
|---|---|
| Zinc sulfide, 80 mμm | 200 |
| Curing agent: Colonate L | 20 |
| Lubricant: | |
| Stearic acid-modified silicone | 4 |
| Butyl stearate | 2 |
| Nitrocellulose: | 40 |
| Vinyl chloride-vinyl acetate-vinyl alcohol copolymer (S-lec A manufactured by Sekisui Plastics Co., Ltd.) | 30 |
| Polyurethane elastomer (Essen 5703 manufactured by B. F. Goodrich Co.) | 30 |
| Solvent mixture (MIBK/toluene) | 250 |

The coating material thus prepared was applied onto a polyester film having a thickness of 15 μm and the solvent was evaporated by means of an infrared lamp or hot air. Then, the coated film was subjected to surface smoothing treatement, and then kept in a rolled state in an oven maintained at 80° C. for 48 hours to promote the crosslinking reaction by the isocyanate. The thickness of the back coating layer was 1 μm.

| | Parts by weight |
|---|---|
| Zinc sulfide (50 mμm) | 30 |
| Carbon black | 25 |
| Acryl-modified vinyl chloride-vinyl acetate-vinyl alcohol copolymer having a molecular weight of 30,000. | 40 |
| Acryl-modified polyurethane elastomer having a molecular weight of 20,000. | 40 |
| Polyfunctional acrylate having a molecular weight of 1,000 | 20 |
| Stearic acid | 4 |
| Butyl stearate | 2 |
| Solvent mixture (MIBK/toluene) | 250 |

The mixture having the above composition was dispersed in a ball mill for five hours, and the dispersed mixture was coated on the rear surface of the polyester film, on which a magnetic layer had already been formed, in such a manner that the thickness of the backing layer upon drying would be 1 μm. Then, this backing layer was irradiated with electron beams in a nitrogen (N$_2$) gas by means of an electron curtain type electron beam accelerator at an accelerating voltage of 150 KeV, at an electrode current of 10 mA, and at an absorption dose of 5 Mrad.

Back coating layer 3 (radiation curable type)

| | Parts by weight |
|---|---|
| CaCO$_3$ 80 mμm | 50 |
| Acryl-modified vinyl chloride-vinyl acetate-vinyl alcohol copolymer having a molecular weight of 30,000 | 30 |
| Acryl-modified polyurethane elastomer having a molecular weight of 50,000 | 30 |
| Acryl-modified phenoxy resin having a molecular weight of 35,000 | 20 |
| Polyfunctional acrylate having a molecular weight of 500 | 20 |
| Stearic acid | 4 |
| Solvent (MEK/toluene = 1/1) | 300 |

The above mixture was treated and applied in the same manner as back coating layer 2 above. The thickness of the back coating layer was 1 μm.

In an alloy tape, even fine dropouts are problematic, and accordingly it is very important that the coating layer is tough and free from abrasion and dropouts are minimum.

The surface roughness of the video tape in the combination of the above magnetic layer 2 and the back layer 2, was studied.

FIG. 1 shows the video S/N ratio (relative value) in a case where the video tape was driven at a speed of 3.8 m/sec and recording and reproduction were conducted at a major frequency of 5 MHz. The numbers allotted to the curves indicate the surface roughness of the magnetic layers. It is evident from FIG. 1 that the S/N ratio can be kept at a high level when the surface roughness of the magnetic layer is at most 0.08 μm and the surface roughness of the back coating layer is at most 0.6 μm. The same applies to other combinations. When the inorganic pigment had a particle size exceeding 0.7 μm, there was an undesirable reduction of the surface roughness of the back coating layer.

Figure 2:
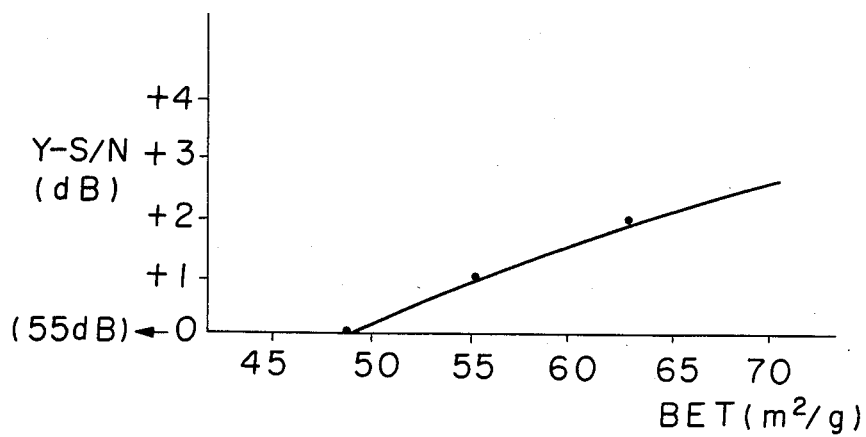
FIG. 2 is a graph illustrating the relation between the BET specific surface area of an alloy magnetic powder and the video signal to noise ratio Y-S/N, where Y signifies video and S/N the signal to noise ratio.

With respect to the above video tape, the relation between the BET specific surface area of the alloy powder and the video S/N ratio within the range wherein the surface roughness of the magnetic layer is at most 0.08 μm and the surface roughness of the back coating layer is from 0.05 to 0.6 μm, was investigated whereby the results as shown in FIG. 2 were obtained. In this case, 55 dB was used as the reference. It is evident from FIG. 2 that excellent characteristics are obtainable when the BET value is at least 48 m²/g. The same applies to other combination.

Now, specific Examples for adjusting the stiffness of the ferromagnetic alloy image recording tape of the present invention will be described.

1. Adjustment of the stiffness by changing the thickness of the base film

Figure 3:
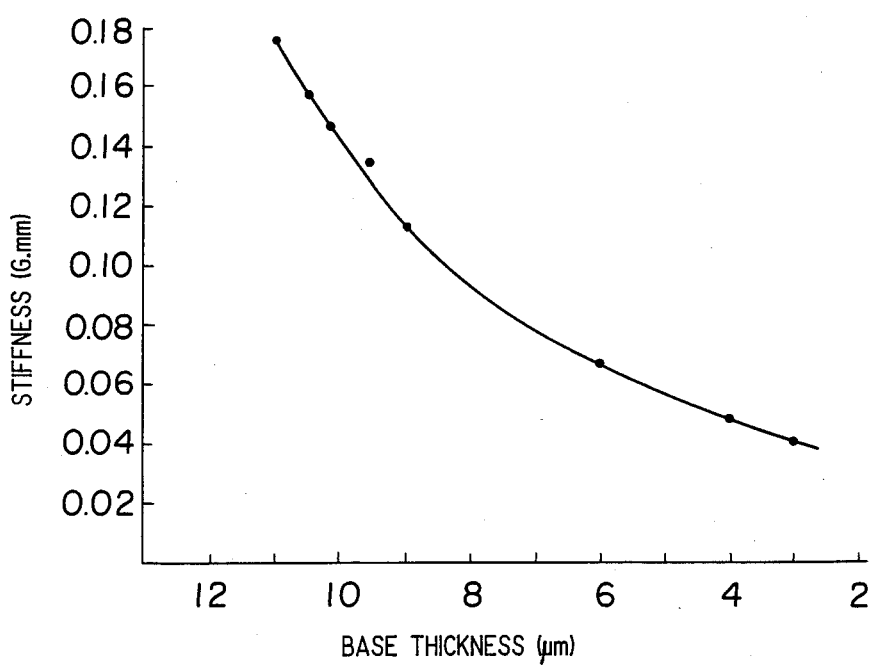
FIG. 3 is a graph illustrating an example of the relation between the base film thickness and the stiffness in the ferromagnetic alloy image recording tape of the present invention.

In a ferromagnetic alloy tape in which the composition of the magnetic layer is that the magnetic layer 1, the stiffness can be adjusted by changing the thickness of the base film of tensilized polyester (Young's modulus of 800 kg/mm²) with the magnetic layer being of thickness 2 μm. For instance, the thickness of the base film of the tensilized polyester for the ferromagnetic alloy magnetic layer in the combination of the ferromagnetic alloy magnetic layer of the composition of the ferromagnetic alloy layer 1 and of thickness 2 μm and the back coating layer 2 of thickness 1 μm was varied to be 11, 10.5, 10, 9.5, 7, 6, 4 and 3 μm, whereby the stiffness changed as shown in FIG. 3.

Further, characteristics of the magnetic tapes are shown in Table 1.

recording medium having superior electromagnetic conversion characteristics and physical properties. The stiffness is preferably from 0.13 to 0.05, more preferably from 0.11 to 0.06.

2. Adjustment of the stiffness by changing Young's modulus of the base film (1) (i) The base film having a thickness of 11.0 μm was changed to a polyester base film of balanced type having a Young's modulus of 400 kg/cm², whereby the stiffness became 0.09 g.mm.

(2) The base film having a thickness of 11.0 μm of (i) was changed to a polyester base film of tensilized type having a Young's modulus of 300 kg/mm², whereby the stiffness became 0.07 g.mm.

The tapes obtained in (1) and (2) had a fluctuation of the output of 0.2 dB, and no clogging took place. The dropouts were not higher than 20, thus indicating a superior property. Further, the running durability was found to be excellent.

3. Adjustment of the stiffness by using a lamination base film

The base film having a thickness of 11.0 μm of (i) was changed to a lamination base film comprising a polyester base film of balanced type having a Young's modulus of 400 kg/cm² and a polypropylene having a Young's modulus of 200 kg/cm², whereby the stiffness became 0.07 g.mm. As the stiffness lowered, the fluctuation of the output was minimized, no clogging took place, and dropouts were minimized.

4. The stiffness of the combination of the magnetic layer 2 (2 μm)-the base film (11 μm) was 0.17 g.mm. The magnetic layer 2 was changed to a composition comprising 15 parts by weight of vinyl chloride and 17 parts by weight of urethane, whereby the stiffness be-

TABLE 1

| Base film thickness | 11 | 10.5 | 10 | 9.5 | 7 | 6 | 4 | 3 |
|---|---|---|---|---|---|---|---|---|
| Stiffness (g · mm) | 0.17 | 0.15 | 0.14 | 0.13 | 0.11 | 0.06 | 0.05 | 0.04 |
| At initial stage of runs at 20° C. under a relative humidity of 60% | | | | | | | | |
| Output fluctuation (dB) | 3 | 0.5 | 0.5 | 0.3 | 0.2 | 0.2 | 0.4 | 2.0 |
| Clogging | Substantial | Slight | Slight | None | None | None | Slight | Substantial |
| Dropouts (number/min.) | 2000 | 70 | 70 | 40 | 20 | 20 | 80 | 2000 |
| After 30 runs at 20° C. under a relative humidity of 60% | | | | | | | | |
| Clogging | Substantial | Small | Small | Slight | None | None | Small | Stopped during the second run |
| Adherence to the tape | Small | None | None | None | None | None | Slight | — |
| Edge damage | None | None | None | None | None | None | Small | Substantial |

8 mm Deck

As is evident from Table 1, when the stiffness exceeds 0.15, the head touch tends to be poor, and the output fluctuation and clogging increase as the characteristics at the initial stage. Consequently, the number of dropouts is great. The adherence of the tape to the head is minimum. Thus, it is apparent that the clogging and the fluctuation of the output are attributable to the poor head touch.

On the other hand, if the stiffness is less than 0.05, the friction increases, and the running tends to be unstable, whereby the fluctuation of the output increases, and the head touch is so strong that the clogging is likely to result. Consequently, the number of dropouts is great. Due to the high friction, the tape stopped running during the second run.

Thus, by adjusting the stiffness to a level within a range of from 0.15 to 0.05, it is possible to obtain a came 0.14 g.mm. Satisfactory results were obtained with respect to the fluctuation of the output, clogging and dropout. Further, by replacing the base film by a balanced type having a Young's modulus of 400 kg/cm², the stiffness became 0.07 g.mm, thus presenting even better results.

Similar results were obtained by changing the amount and type of the inorganic filler.

5. Adjustment of the stiffness by using a flexible material for the back coating layer For instance, a combination of a ferromagnetic alloy magnetic layer 1 (3 μm)-polyester base film (10 μm) (super tensilized, Young's modulus: 800 kg/cm²) with a back coating layer with Zn formed by a vapour deposition method under a vacuum of $5 \times 10^{-6}$ Torr and stearic acid fixed thereon by a vapour deposition method, had a stiffness of 0.17 g.mm, whereby there were substantial fluctuation of the output, clogging and dropouts, and thus it was inferior in these properties.

By replacing the above back coating layer by a back coating layer 1, the stiffness became 0.14 g.mm, whereby satisfactory results were obtained with respect to the fluctuation of the output, clogging and dropouts. Further, the base film was changed to a balanced type having a Young's modulus of 400 kg/cm$^2$, whereby the stiffness became 0.07 g.mm, and better results were obtained.

Similar results can be obtained by changing the thickness of the back coating layer.

6. Other methods (1) Thickness or strength of the ferromagnetic alloy magnetic layer (2) A flexible undercoating is provided beneath the ferromagnetic alloy magnetic layer and/or the back coating layer, or a pigment is incorporated for stiffening.

In this case, a radiation curable resin may be employed for the undercoating, and there may be employed inorganic fillers or fine particulate pigments as used for the back coating layer or a coating layer, such as $SiO_2$, $ZrO_2$, $Cr_2O_3$, $Al_2O_3$, $Y_2O_3$, $CeO_2$, $Fe_3O_4$, $Fe_2O_3$, $ZrSiO_4$, $Sb_2O$ and $TiO_2$. These materials may be prepared by usual vapour phase, solid phase or liquid phase methods or electrolytic methods. In the case of $SiO_2$, the fine particulate pigment is available in the form of (1) a colloidal solution of super-fine particles of silicic anhydride (Snowtex (trademark), an aqueous system, a methanol silica sol, etc., manufactured by Nissan Chemical Industries, Ltd.) or (2) super-fine particulate anhydrous silica (Standard product: 100 Å) produced by burning purified silicon tetrachloride (Aerosil (trademark), manufactured by Nippon Aerosil Co., Ltd.).

Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments.

When methanol $SiO_2$ is used as the undercoating layer, it may be applied as it is.

The fine particulate pigment preferably comprises from 1,000 to 1,000,000 particles/100 $\mu m^2$.

(3) The Young's modulus may also be adjusted by incorporating the above fine particulate pigment into the top coating layer.

The foregoing is applicable also to the back coating layer 3.

The radiation curable type is preferred in that there will thereby be no substantial difference in the electromagnetic conversion characteristics as between the inside and the outside of the jumbo roll. The various properties were measured by the following methods.

1. Stiffness

The stiffness is represented by the following formula:

$$0.149 \times \frac{w \times a^3}{d \times b} \ g \cdot mm$$

where
w: load (g)
a: radius of the tape ring (mm)
b: width of the tape (mm)
d: deformation of the tape ring (mm)

2. Fluctuation of the output The recording and reproduction were conducted at a major frequency of 5 MHz, whereby the fluctuation of the output was measured.

3. Dropouts

By using a VHS deck at 20° C. under a realtive humidity of 60%, a single signal of 5 MHz was recorded and reproduced, whereby a number of samples wherein the reproduced signal lowers by at least 18 dB from the average reproduced level for at least 15 micro seconds, were counted with respect to 10 samples for 1 minute each, and the average number was taken as dropouts.

4. Edge damage

The damages of the tape edges of the tape after 50 runs were evaluated by naked eyes.

We claim:

1. A ferromagnetic alloy image recording tape characterized by having a magnetic layer of a ferromagnetic alloy powder in a binder on a non-magnetic base film as a substrate, and which contains an inorganic pigment having an average particle size of at most 0.7 $\mu m$ and a Mohs hardness of at least 6 in the magnetic layer, which tape has a back coating layer containing an inorganic pigment, and which tape has a flexible undercoating beneath the back coating layer and a pigment of average particle size of at most 500 Å in the flexible underocoating;

wherein the stiffness of the entire tape is represented by the formula $$0.149 \times \frac{w \times a^3}{d \times b} = 0.05 \ to \ 0.15 \ g.mm$$

wherein
w: load (g)
a: radius (mm) of the tape ring
b: width (mm) of the tape
d: deformation (mm) fo the tape ring.

* * * * *